June 18, 1940.   H. COPE   2,204,724
VALVE SEAT
Filed July 22, 1938

Inventor:
HAROLD COPE,
by: John E Jackson
his Attorney.

Patented June 18, 1940

2,204,724

UNITED STATES PATENT OFFICE 2,204,724

VALVE SEAT

Harold Cope, Donora, Pa.

Application July 22, 1938, Serial No. 220,811

3 Claims. (Cl. 251—168)

This invention relates to valves and, particularly, to an improved valve seat for valves adapted to be cooled.

Some valves, when in use, are subject to excessive heat, such as when used in the hot blast main of blast furnaces, and it is desirable for various reasons that valves in such use be cooled in some suitable manner. Various means have been suggested and used for cooling such valves and water was usually employed as the cooling agent. Heretofore, the valve seats were usually made of hollow castings, or steel plate sections welded together, or of heavy rolled sections which were machined to form a suitable cooling fluid passageway. In some cases, valves having such valve seats were satisfactory, but in most cases they were impractical and very unsatisfactory. The cast valve seats oftentimes fail due to weak grain structure, while the welded plate type are subject to leakage inside the line and the machined valve seats are expensive to manufacture and interfere with the action of the air or gases passing through the valve; also, in case leakage occurs in such valve seats, it is usually necessary to shut down the furnace until such leakage is repaired, thereby subjecting to damage the product or products being heat treated, which results in reducing the quality thereof.

According to the present invention, there is provided a cooled valve seat which is inexpensive and simple in construction, and one that can be easily assembled in the valve.

It is an object of the present invention to provide an improved valve seat in which the cooling medium is constantly in the closest proximity to the hottest portion of the valve seat.

It is another object of the invention to provide a cooled valve seat having a dual cooling means which can be easily and quickly repaired in case of damage or leakage.

Various other objects and advantages of this invention will be more apparent in the course of the following specification and will be particularly pointed out in the appended claims.

In the accompanying drawing, there is shown, for the purpose of illustration, one embodiment which my invention may assume in practice.

Figure 1:
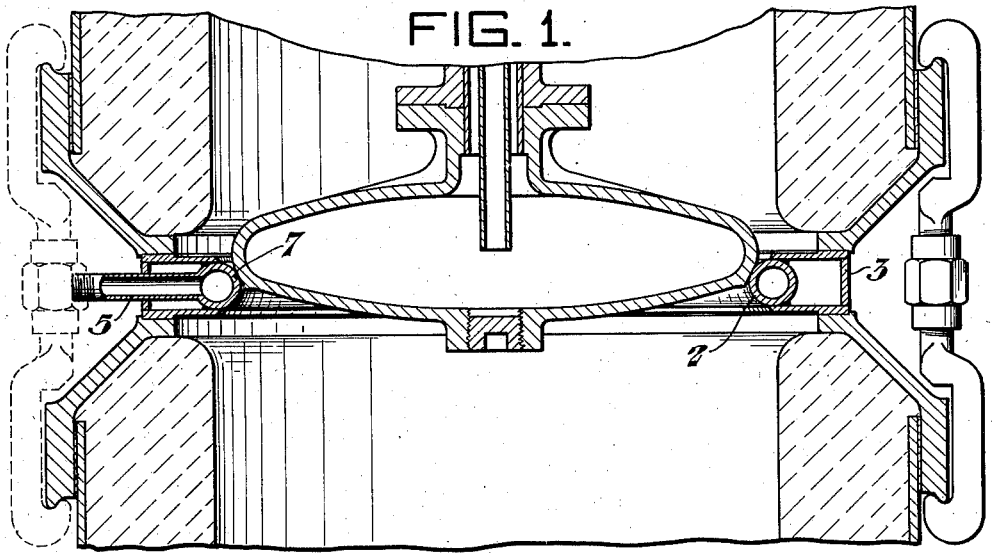
Figure 1 is a vertical section through a valve in which the improved valve seat of my invention is incorporated.

Referring more particularly to the drawing, the improved valve seat of my invention is shown, for the purpose of illustration, incorporated in a valve of the mushroom type but it will be understood that my improved valve seat may be used in any similar type valve.

The improved valve seat of my invention comprises preferably a circular tubular member 2 having a hollow box-like member 3 secured to and arranged continuously around the outer side thereof. The member 2 need not necessarily be circular in cross-section but may be oval, square, hexagonal, or of any other suitable section. The outer hollow member 3 is preferably made by a plurality of plates welded together and has preferably a rectangular cross-section, as shown. There is arranged between the ends of the tubular member, the ends of said member being welded thereto, a partition in the form of a plate 4 in the tubular member 2 and the box-like hollow member 3 for purposes to be described hereinafter.

On each side of the partition plate 4 there are positioned pipe connections 5 which extend through the hollow member to communicate with the tubular member 2 and are preferably welded thereto, and pipe connections 6 which communicate with the outer hollow member 3 are also preferably welded thereto. One of these members on each side of the plate 4 is the inlet connection and the other the outlet connection for the respective cooling chambers to which they are connected.

Figure 2:
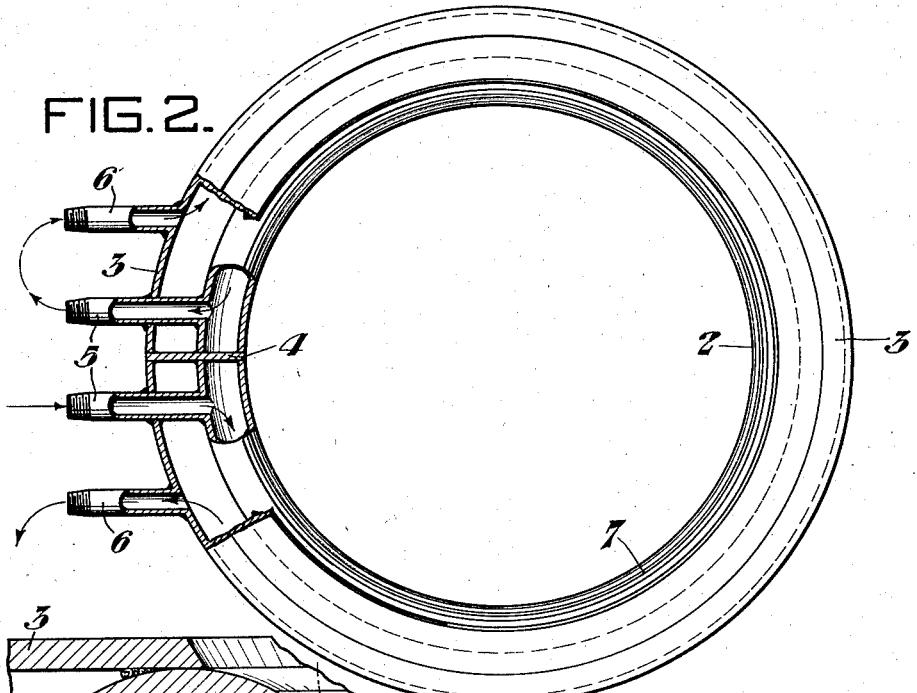
Figure 2 is a plan, partly in section, of my improved valve seat.
Figure 3:
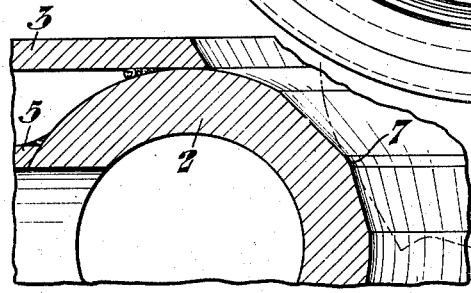
Figure 3 is an enlarged section, showing the valve seating portion of the valve seat.

This valve seat is preferably water-cooled, but any other suitable cooling medium, such as air, may be used. The water enters the inner tubular member 2 and the outer hollow member 3 through the connections 5 and 6 on one side of the plate 4 and leaves these members by means of the connections on the opposite side of the plate 4, the plate 4 acting as a barrier or a stop to permit the water to flow out of the members after they have been cooled thereby. If desired, however, the water may be conveyed from the discharge connection of either the tubular member or outer hollow member back through the other member to receive the full benefit of the cooling effect of the water or cooling medium used, as shown in Figure 2.

The tubular member 2 and the outer hollow member 3 are preferably made of the same material, but sometimes it may be desirable to have these members made from different materials so as to provide a more rugged valve seat or one that has better conductivity.

The inner tubular member 2 has preferably a flat seating surface 7 machined or otherwise formed thereon on the inner upper side thereof so as to provide a suitable seat for the valve when it is closed, and positioned thereon. If a tubular member having a hexagonal cross-section be used, it would probably not be necessary to provide such a seat, as one of the sides of the tube would then act as a suitable seat for the valve.

As a result of my invention, it will be seen that I have provided a valve seat by which, if leakage occurs in either of the cooling chambers, the cooling chamber in which the leakage occurs can be shut off to prevent the cooling liquid from entering the blast line or the line in which the valve is being used and that section can then be cooled by some other medium, such as air, which will not affect the quality of the product controlled by the valve. The other water channel of the valve seat, which may still be intact, can be disconnected from the damaged or broken one that is leaking and can then be cooled by the original cooling medium in the original manner. The damage to the cooling chamber can then be repaired at any suitable time, that is, whenever the valve is not in use. By providing two cooling chambers, it will be seen that there is provided a valve which is quickly and most efficiently cooled.

While I have shown and described an embodiment of my invention, it will be understood that this embodiment is merely for the purpose of illustration and description and that various other forms may be devised within the scope of my invention, as defined in the appended claims.

I claim:

1. In a valve of the class described, a valve seat comprising an inner hollow portion and an outer hollow portion formed therearound concentric therewith through both of which a cooling medium is adapted to pass, said inner hollow portion consisting of a circular-shaped cylindrical seamless tubular member having its ends oppositely disposed and securely attached to the opposite sides of a partition plate member so as to interrupt the continuity of the opening through the same therearound, said outer hollow portion consisting of means arranged around and securely attached to said seamless cylindrical tubular member so as to form a hollow chamber therearound, means for interrupting the continuity of the opening around said outer hollow portion, means for introducing a cooling medium into both said inner and outer hollow portions to cool the same, and means for conveying the same therefrom.

2. In a valve of the class described, a valve seat comprising an inner hollow portion and an outer hollow portion formed therearound concentric therewith through both of which a cooling medium is adapted to pass, said inner hollow portion consisting of a circular-shaped cylindrical seamless tubular member having its ends oppositely disposed and securely attached to the opposite sides of a partition plate member so as to interrupt the continuity of the opening therearound through the same, said outer hollow portion consisting of a plurality of plates securely welded together and to said inner cylindrical seamless tubular member so as to provide a hollow portion therearound having substantially a rectangular-shaped cross section through which a cooling medium is adapted to pass with said partition plate extending into said outer hollow portion so as to interrupt also the continuity of the opening therethrough and therearound, means for introducing a cooling medium into both said inner and outer hollow portions to cool the same, and means for conveying the same therefrom.

3. In a valve of the class described, a valve seat comprising an inner hollow portion and an outer hollow portion formed therearound concentric therewith through both of which a cooling medium is adapted to pass, said inner hollow portion consisting of a circular-shaped cylindrical seamless tubular member having its ends oppositely disposed and securely attached to the opposite sides of a partition plate member so as to interrupt the continuity of the opening therearound through the same, said outer hollow portion consisting of a plurality of plates securely welded together and to said cylindrical seamless tubular member so as to provide a hollow portion therearound having substantially a rectangular-shaped cross section through which a cooling medium is adapted to pass with said partition plate extending into said outer hollow portion so as to interrupt also the continuity of the opening therethrough and therearound, said inner seamless tubular member having a substantially flat surface arranged around the inner periphery thereof adjacent the top of the same so as to provide a seat for the valve when closed, means for introducing a cooling medium into both said inner and outer hollow portions to cool the same, and means for conveying the same therefrom.

HAROLD COPE.